United States Patent [19]
Olsen

[11] 3,781,454
[45] Dec. 25, 1973

[54] ELECTRIC HIGH-TENSION CONDUCTOR ASSEMBLY

[75] Inventor: Willi Olsen, Berlin, Germany

[73] Assignee: Siemens Aktiengesellschaft, Munich, Germany

[22] Filed: Dec. 13, 1972

[21] Appl. No.: 314,561

[30] Foreign Application Priority Data
Dec. 23, 1971 Germany.................. P 21 65 283.5

[52] U.S. Cl..................... 174/11 R, 174/19, 174/28
[51] Int. Cl...... H02g 15/22, H01b 9/04, H01b 9/06
[58] Field of Search ................. 174/11 R, 16 B, 19, 174/20, 22 C, 23 R, 28

[56] References Cited
UNITED STATES PATENTS

| | | | |
|---|---|---|---|
| 3,448,202 | 6/1969 | Whitehead............................ | 174/28 |
| 3,585,271 | 6/1971 | Reynolds et al. ................. | 174/28 X |
| 3,725,567 | 4/1973 | Olsen et al........................ | 174/28 X |

*Primary Examiner*—Laramie E. Askin
*Attorney*—Hugh A. Chapin et al.

[57] ABSTRACT

An electric high-tension conductor assembly includes an electric conductor which carries a high-voltage current and a grounded electrically conductive enclosure surrounding this conductor with the latter spaced from the inside of this enclosure, the conductor and enclosure being elongated and the enclosure having an end cap in which the conductor has a terminating end spaced therein. Provision is made to assure that any arc formed between the conductor and the enclosure travels to that terminating end of the conductor and stays there. The enclosure's end cap is made safely resistant to the stationary arc. Therefore, the enclosure itself may be made on non-magnetic metal, to prevent excessive eddy current losses, with a wall thickness and/or composition only safely adequate to be resistant to the traveling arc.

9 Claims, 2 Drawing Figures

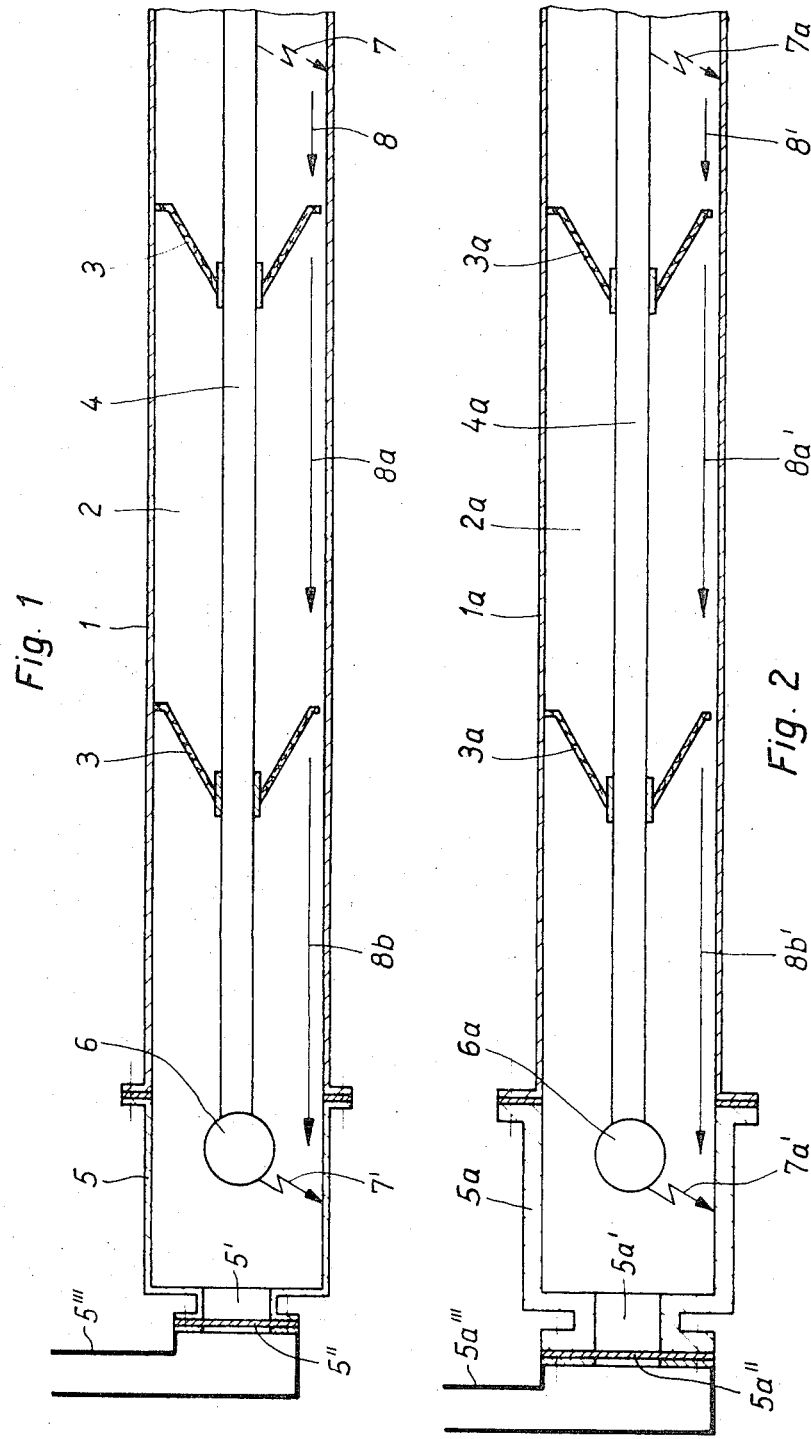

ELECTRIC HIGH-TENSION CONDUCTOR ASSEMBLY

BACKGROUND OF THE INVENTION

Electric high-tension conductor assemblies of the type including an electric conductor encased in an electrically conductive enclosure and spaced from the inside of this enclosure, the conductor and enclosure both being elongated, are used for high-voltage electric power transmission lines, single-phase or multi-phase conductor bars, or as connecting conductors, in connection with high-voltage metal-clad switch gear and the like. The enclosure contains pressurized electrically insulating gas, such as pressurized sulfurhexafluoride.

To protect persons in the vicinity of such an enclosure, the latter is electrically grounded. It is important that the integrity of the enclsoure never be lost considering the extremely high voltages involved by equipment of the type indicated and the hazard presented by the pressurized gas should it escape.

It is desirable to make the enclosure from a non-magnetic metal or metal alloy to avoid eddy current losses, the current carried by the conductor being an alternating current. This indicates the use of a non-ferrous metal alloy such as an aluminum alloy, or a non-magnetic ferrous alloy such as an austenitic stainless steel. These are expensive metals relative to plain carbon steel, for example. Therefore, if such non-magnetic materials are to be used, it is important to make the enclosure with as thin a wall thickness as is possible without risking the danger that an arc may form between the conductor and the enclosure's inside and burn through the enclosure and create a hazard to persons in the vicinity.

SUMMARY OF THE INVENTION

The object of the present invention is to provide an assembly of the type described which permits the use of such a thinner walled enclosure than might otherwise be safe.

According to this invention the above object is attained by making the enclosure with a thinner wall than could ordinarily be used safely in the event an arc is formed which remains stationary, but which is thick enough to be safe in the case of an arc which travels between the conductor and the enclosure's inside along their length. The electrically insulating spacers which are used to hold the conductor spaced within the inside of the enclosure are of the permeable type through which the arc can travel. The enclosure is provided with a terminating end to which an end cap is attached, this having a cup-shape for example. The conductor is extended so that it has an end terminating within this end cap in spaced relation to its inside. This terminating end of the conductor is provided with an electrically conductive enlargement, such as a sphere. With this arrangement, if arcing should occur between the conductor and the enclosure's inside, it will travel to the conductor's terminating end and remain there as a substantially stationary arc between this end and the inside of the enclosure's end cap.

This end is made safely resistant to being burnt through by this stationary arc, making it economically feasible to make the enclosure of a non-magnetic metal or metal alloy because its wall thickness need be only thick enough to withstand the momentary heating of the traveling arc.

For example, the enclosure, normally cylindrical, may comprise a relatively thin-walled tube made of aluminum or aluminum alloy to provide a light-weight construction while avoiding eddy current losses. Such an enclosure would not ordinarily resist the heating caused by a standing or stationary arc and would present a serious hazard, particularly when the enclosure is filled with an electrically insulating gas under pressure. With the present invention an arc forming between the conductor and the enclosure would travel to the terminating end of the conductor where it would remain, and by making the end cap, which must withstand this arc, of a more heat-resistant metal or alloy, such as steel, or with a safely thick wall, the danger of a burn-out is avoided.

If the enclosure is made of a non-magnetic ferrous alloy, such as an austenitic stainless steel tube for example, it may be made thinner walled and, therefore, less expensive than would otherwise be possible while being also safe. In this case the end cap may be made of ordinary plain-carbon steel for example, and provided with a relatively thicker wall. This may also be done in the case of the non-ferrous metal or metal alloy enclosure.

With the enclosure and its end cap filled with the pressurized gas, the standing arc in the end cap may produce enough heat to increase the gas pressure to an unsafe value. However, the end cap may be provided with a hole sealed by a burstable disk which lets go or bursts at a predetermined gas pressure safely less than might rupture the relatively thin-walled enclosure, the gas that would then escape being piped away to a safe location for disposal.

BRIEF DESCRIPTION OF THE DRAWINGS

Preferred embodiments of the present invention are schematically illustrated by the accompanying drawings in which:

FIG. 1 in longitudinal section shows the example of a non-ferrous metal or metal alloy enclosure provided with an end cap of a more heat resistant metal or metal alloy; and FIG. 2, in the same manner, shows the example of the non-magnetic ferrous metal alloy enclsoure using the end cap having a wall which is thicker than the wall of the enclosure.

DESCRIPTION OF THE PREFERRED EMBODIMENTS

In FIG. 1 the enclsoure 1 is a cylindrical tube made of a non-ferrous metal, such as aluminum or aluminum alloy, and its interior 2 contains pressurized sulfurhexafluoride and insulating spacers 3 positioning the linear electric conductor 4 concentrically within the enclosure 1. The spacers 3 are of the type which do not divide the space 2 into individual gas-filled chambers, but are permeable so that an arc can travel lengthwise with respect to the enclosure 1 and conductor 4. The end cap 5, made of steel and cup-shaped as previously mentioned, is gas-tightly connected by suitable means to the terminating end of the enclosure 1; and the terminating end of the conductor 4 which is within this end cap is provided with an electrically conductive spherical enlargement 6. Of course, the enclosure 1, the conductor 4 and the end cap 5 are all made of electrically conductive materials.

The end or bottom of the cup-shaped end cap 5 is provided with a gas escape port or opening 5' closed by a burstable disk 5'' and provided with a gas escape duct 5''' which goes to a safe gas disposal location.

In operation, an arc 7 forming between the conductor 4 and the inside of the casing 1 would present a dangerous hazard if it remained stationary because the tube 1 made of aluminum or aluminum alloy, or other light-weight or non-ferrous metal or alloy of that metal, is made too thin, in the interest of economy and light-weight, to be resistant to the resulting heat. If the enclsoure 1 burnt through, both electric shock and explosion hazards would be created on the outside of the casing 1.

With the present invention the arc 7 would rapidly travel in the direction of the arrows 8, 8a and 8b to form a standing or stationary arc 7' between the sphere 6 and the end cap 5. The arc would remain there until the current in the conductor 4 is cut off. With the end cap 5 made of steel, it is inherently more resistant to heat than the enclosure 1. If the gas pressure becomes excessive, the disk 5'' bursts and the gas escapes via the opening 5' and the conduit 5'''.

In FIG. 2, where the corresponding parts of FIG. 1 are correspondingly numbered but differentiated by the appended letter "a or by the addition of primes," the enclosure 1a is made from a non-magnetic ferrous alloy, such as an austenitic stainless steel, and it also is made with a wall thickness too thin to be able to safely withstand a standing arc but which is completely safe so long as the arc is traveling. In this case the end cap 5a is made with a thicker wall than the enclosure 1a and it may be made of ordinary plain-carbon steel if desired.

It can be seen from the foregoing that fundamentally the present invention reduces the cost and weight of assemblies of the type described by permitting a reduction in the enclosure's wall thickness, while at the same time providing for safety in the event of arcing between the conductor and the inside of the enclosure. The end cap may be made either of a metal or metal alloy inherently more resistant to heat than the metal from which the enclosure is made, with the end cap and enclosure's wall thickness being the same, or the end cap may be made with the wall thickness substantially greater than that of the enclosure. The end cap need not be made of non-magnetic material because of its compact length, whereas the enclosure itself should be made of non-magnetic material if eddy current losses are to be reduced or avoided.

What is claimed is:

1. An electric high-tension conductor assembly including an electric conductor and an electrically conductive enclosure surrounding said conductor with the latter spaced from the inside of this enclosure, said conductor and enclosure being elongated; wherein the improvement comprises said enclosure being resistant to an electric arc formed and traveling between the conductor and the enclosure lengthwise with respect to the two but not resistant to said arc when it is stationary, and the enclosure having an end cap constructed to be resistant to said arc when it is stationary and said conductor having a terminating end within said cap and spaced from the latter's inside, the interior of said enclosure being free from obstructions preventing said arc from traveling to its said terminating end spaced within said end cap.

2. The assembly of claim 1 in which said enclosure contains an electrically insulating gas under pressure.

3. The assembly of claim 2 in which the enclosure's said end cap is provided with means for releasing said gas when its pressure becomes excessive.

4. The assembly of claim 3 in which said means is a burstable disk closing a port in the wall of said end cap.

5. The assembly of claim 2 in which said conductor is linear and said enclosure is cylindrical with the conductor spaced concentrically therein by arc-permeable spacers, said end cap being cup-shaped, the conductor's end spaced within this end cup being enlarged relative to the balance of said conductor.

6. The assembly of claim 5 in which said end cap is made of a ferrous alloy and the enclosure is made of a non-ferrous metal or non-ferrous metal alloy.

7. The assembly of claim 5 in which said end cap is made of a ferrous alloy having a greater wall-thickness than does the enclosure and the latter is made of a non-magnetic ferrous alloy.

8. The assembly of claim 1 in which said enclosure is made of non-ferrous metal or non-ferrous metal alloy and said end cap is made of a ferrous alloy.

9. The assembly of claim 1 in which said enclosure is made of a non-magnetic ferrous alloy and said end cap is made of a ferrous alloy and is substantially thicker walled than is said enclosure.

* * * * *